(12) United States Patent
Strong et al.

(10) Patent No.: US 9,329,884 B2
(45) Date of Patent: May 3, 2016

(54) MANAGING GENERATED TRACE DATA FOR A VIRTUAL MACHINE

(71) Applicants: Beeman C. Strong, Portland, OR (US); Jason W. Brandt, Austin, TX (US); Gilbert Neiger, Hillsboro, OR (US)

(72) Inventors: Beeman C. Strong, Portland, OR (US); Jason W. Brandt, Austin, TX (US); Gilbert Neiger, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/329,192

(22) Filed: Jul. 11, 2014

(65) Prior Publication Data

US 2016/0011893 A1    Jan. 14, 2016

(51) Int. Cl.
*G06F 9/455* (2006.01)

(52) U.S. Cl.
CPC ........ *G06F 9/45533* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 4,787,031 | A  | * | 11/1988 | Karger et al. .................. 718/100 |
| 5,668,994 | A  | * | 9/1997  | Swagerman ................... 718/102 |
| 6,266,789 | B1 | * | 7/2001  | Bucher .................... H04L 43/18 707/999.006 |
| 6,738,965 | B1 | * | 5/2004  | Webster .............. G06F 11/3636 714/E11.212 |
| 6,961,806 | B1 | * | 11/2005 | Agesen et al. ..................... 711/6 |
| 7,454,665 | B2 | * | 11/2008 | Menadue ............ G06F 11/0775 711/173 |
| 7,747,989 | B1 | * | 6/2010  | Kissell .......................... 717/148 |
| 7,818,721 | B2 | * | 10/2010 | Sundararajan et al. ....... 717/130 |
| 8,136,096 | B1 | * | 3/2012  | Lindahl et al. ................ 717/129 |
| 8,832,682 | B2 | * | 9/2014  | Xu et al. ........................... 718/1 |
| 9,053,064 | B2 | * | 6/2015  | Garthwaite et al. |
| 2003/0131039 | A1 | * | 7/2003 | Bajoria et al. ..................... 709/1 |
| 2005/0268158 | A1 | * | 12/2005 | McIntosh et al. ................ 714/5 |
| 2005/0278574 | A1 | * | 12/2005 | Kitamorn et al. .............. 714/34 |
| 2006/0277435 | A1 | * | 12/2006 | Pedersen ............. G06F 11/3636 714/30 |
| 2007/0180439 | A1 | * | 8/2007  | Sundararajan et al. ....... 717/158 |
| 2008/0010551 | A1 | * | 1/2008  | Arndt et al. ..................... 714/45 |
| 2008/0243970 | A1 | * | 10/2008 | Schmelter ........... G06F 11/3466 |
| 2008/0244531 | A1 | * | 10/2008 | Schmelter et al. ............ 717/128 |
| 2008/0263309 | A1 | * | 10/2008 | Attinella ....................... 711/173 |
| 2009/0248611 | A1 | * | 10/2009 | Xu et al. .......................... 707/1 |
| 2010/0161875 | A1 | * | 6/2010  | Chang et al. ..................... 711/6 |
| 2012/0011504 | A1 | * | 1/2012  | Ahmad et al. .................... 718/1 |
| 2014/0156910 | A1 | * | 6/2014  | Uttamchandani et al. ..... 711/103 |
| 2014/0164722 | A1 | * | 6/2014  | Garthwaite et al. .......... 711/162 |
| 2014/0164723 | A1 | * | 6/2014  | Garthwaite et al. .......... 711/162 |
| 2014/0301213 | A1 | * | 10/2014 | Khanal et al. .................. 370/248 |
| 2015/0127994 | A1 | * | 5/2015  | Sankar et al. .................. 714/45 |
| 2015/0178168 | A1 | * | 6/2015  | Dunshea et al. .............. 717/130 |

* cited by examiner

*Primary Examiner* — Matthew Brophy
(74) *Attorney, Agent, or Firm* — Lowenstein Sandler LLP

(57) ABSTRACT

A processing device with tracing functionality for a virtual machine is described. The processing device includes a tracing register to store a value indicative of whether tracing is enabled or disabled, a tracing module to generate trace data while tracing is enabled, and an internal buffer to store the trace data. When tracing is disabled, the processing device removes the trace data from the buffer. Mechanisms are described to ensure that the trace data is not corrupted during this process, despite the presence of page faults that may result from trace output writes.

20 Claims, 12 Drawing Sheets

MANAGING GENERATED TRACE DATA FOR A VIRTUAL MACHINE

TECHNICAL FIELD

Embodiments described herein generally relate to processing devices and, more specifically, relate to the management of trace data generated by a processing device.

BACKGROUND

A processing device may generate trace data regarding software executing on the processing device. The trace data may be used by programmers for debugging purposes. The trace data may also be used by system administrators or technical support personnel and software monitoring tools to diagnose problems with installed software. In many computer architectures, there is no mechanism to enable a virtual machine to run traces to obtain trace data associated with that particular virtual machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

A processing device may generate trace data regarding software executing on the processing device. The trace data may be used by programmers for debugging purposes. The trace data may also be used by system administrators or technical support personnel and software monitoring tools to diagnose problems with installed software.

In one embodiment, the processing device generates trace data for a virtual machine (VM) being run on the processing device. The generated trace data may be stored in physical memory addresses corresponding to virtual memory addresses specified by the virtual machine. When one of the physical memory addresses corresponding to a virtual memory address belongs to a page not resident in main memory, a page fault occurs and a VM exit occurs where control of the processing device is transferred from the virtual machine to a hypervisor or virtual machine monitor (VMM) that handles the virtual machine. When this transfer of control occurs, it may be desirable to disable tracing.

When tracing is disabled, trace data stored in an internal buffer of the processing device is flushed. Because there may not be an appropriate page resident in memory to flush the trace data from the buffer, the data may be lost in one embodiment. In another embodiment, the trace data in the buffer is flushed to a dedicated block of memory the hypervisor keeps resident in the main memory referred to as a temporary trace storage buffer (TTSB). In another embodiment, the processing device performs an early page look-up by attempting to access a second output page while a first output page is being used to store generated trace data. Thus, the trace data is flushed to a first output page in the main memory when a page fault occurs for a second output page. In one embodiment, when the first output page is at least a threshold full, a synthetic internal buffer overflow condition is triggered and the processing device ceases generating new packets, and instead inserts packets into the trace indicating that some trace packets may be lost.

When trace data is flushed to a TTSB or to a resident page in anticipation of a non-resident page being retrieved, the trace data is less likely to be lost or corrupted. Thus, a programmer or system administrator may be able to retrieve a complete trace to debug an application or diagnose problems with installed software.

Figure 1:
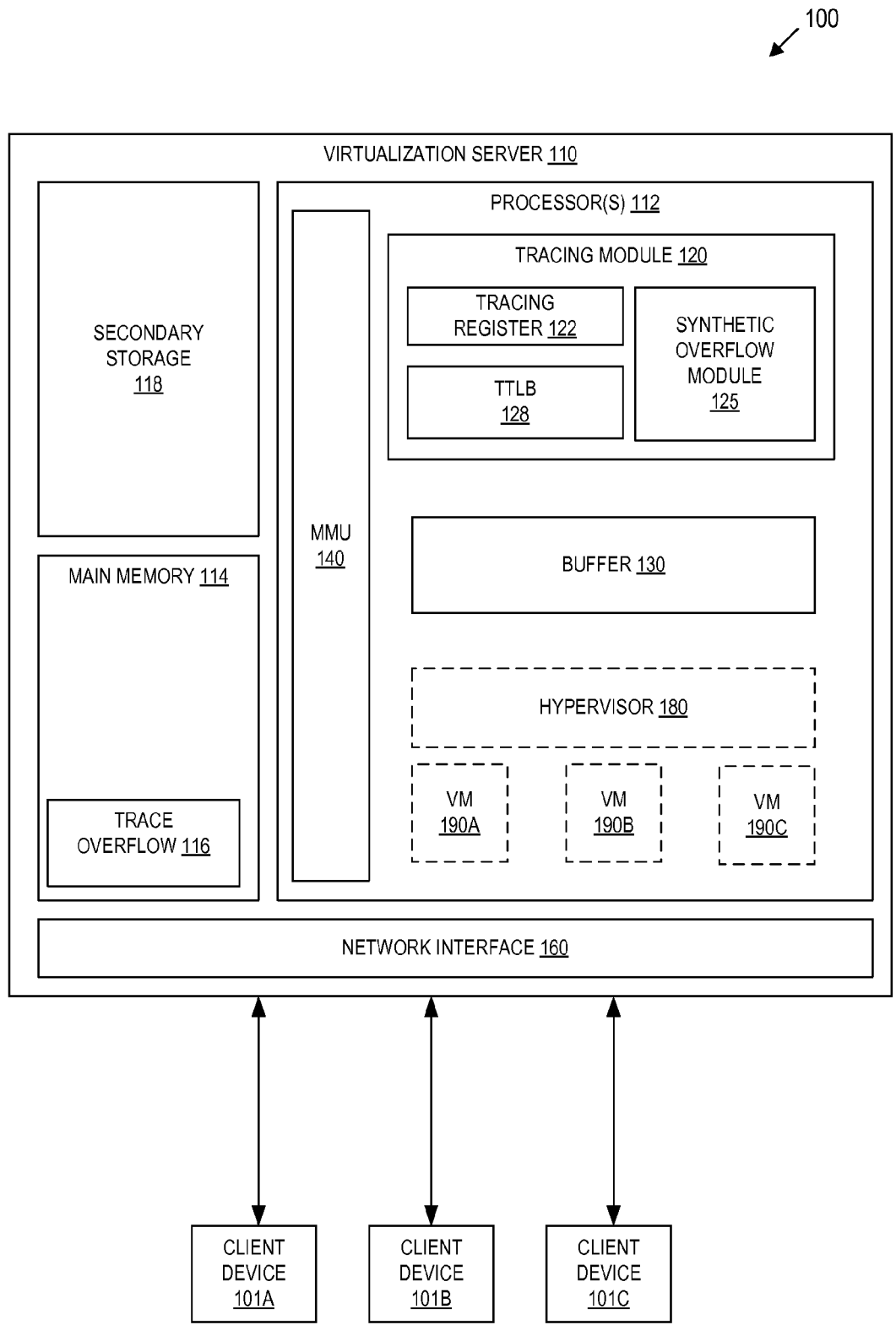
FIG. 1 is a functional block diagram of a virtualization system, according to an embodiment of the disclosure.

FIG. 1 is a functional block diagram of a virtualization system 100 according to an embodiment of the disclosure. The virtualization system 100 includes a virtualization server 110 that supports a number of client devices 120A-120C. The virtualization server 110 includes at least one processor 112 that executes a hypervisor 180 that can instantiate one or more virtual machines 190A-190C accessible by the client devices 120A-120C via a network interface 160.

The virtualization server 110 includes a main memory 114 and a secondary storage 118. Data in the secondary storage 118 may be stored in blocks referred to as pages, and each page may correspond to a set of physical memory addresses. The virtualization server 110 may employ virtual memory management in which applications run by the processor 112, such as the virtual machines 190A-190C, use virtual memory addresses that are mapped to physical memory addresses by a memory management unit 140.

The memory management unit 140 loads pages from the secondary storage 118 into the main memory 114 for faster access by software running on the processor 112. When one of the virtual machine 190A-190C attempts to access a virtual memory address that corresponds to a physical memory address of a page loaded into the main memory 114, the memory management unit 140 returns the requested data. When one of the virtual machines 190A-190C attempts to access a virtual memory address that corresponds to a physical memory address of a page that is not loaded into the main memory 114, a page fault occurs and the memory management unit 140 generates a page fault exception.

When a page fault occurs, control of the processing device 112 may be transferred to the hypervisor 180 (via a VM exit) to service the fault. The hypervisor 180 may handle the page fault exception by pausing the virtual machine, instructing the memory management unit 140 to load the page containing the physical memory address corresponding to the requested virtual memory address, and resuming the virtual machine.

The processor 112 may include a tracing module 120 that generates trace data regarding the software executing on the processor 112 while tracing is enabled. The tracing module 120 may include a trace register 122 that stores a value indicating whether tracing is enabled or disabled. As with other data generated by the processor 112, the trace data may be initially stored in an internal buffer 130 before being written to the main memory 114. Once the trace data is in the main memory 114, software can access the trace data and analyze it or present it to a user for interpretation.

A virtual machine 190A-190C may execute a guest operating system and one or more applications using the processor 112. For example, the virtual machine 190A-190C may execute a debugging application that enables tracing, allowing a user of virtual machine to debug the guest operating system or other applications executed by the virtual machine 190A-190C. The virtual machine 190A-190C may specify a set of virtual memory addresses in which to store the generated trace data. However, this may lead to a tracing page fault if the virtual memory address specified for the trace data corresponds to a physical memory address of a page not loaded into the main memory 114.

When a page fault occurs, such as a tracing page fault, it may be desirable to disable tracing such that the tracing module 120 does not generate tracing data for the hypervisor 180, e.g., for the hypervisor's handling of the page fault exception which may include pausing the virtual machine 190A-190C, loading a page into main memory 114, and resuming the virtual machine 190A-190C. It may be further desirable to enable tracing once the page fault exception has been handled.

When tracing is disabled, the processor 112 may attempt to flush any trace data in the buffer 130 to main memory 114. However, when tracing is disabled due to a tracing page fault, there may be no appropriate page in main memory 114 in which to flush the buffered trace data. In one embodiment, the trace data in the buffer 130 is dropped. However, this may result in lost trace data and may corrupt the trace (e.g., if the end of the prior page was not on a packet boundary or if there is no indicator of the dropped trace data). Thus, in another embodiment, the trace data in the buffer 130 is transferred to a dedicated block of memory the hypervisor keeps resident in the main memory 114 referred to as a TTSB 116.

When the tracing page fault has been serviced such that the requested page has been loaded into main memory 114, the trace data in the TTSB 116 is transferred to the now-resident page, and the virtual machine 190A-190C is resumed with tracing enabled. The transfer of trace data from the TTSB 116 to the now-resident page may be performed by hardware in the processor 112, e.g., by the tracing module 120, or by the hypervisor 180.

In another embodiment, the tracing module 120 include a trace translation lookaside buffer (TTLB) 128 which caches two or more trace output page translations, the current output page in which trace data is being written, and the next output page(s) in which trace data will be written. Each time an output page is filled with trace data, the tracing module 120 will request the translation for the next not-yet-cached page from the memory management unit 140, and if returned, replace the translation for the filled output page with the received translation. In requesting the translation for the next not-yet-cached page, a page fault may occur, which may cause the hypervisor 180 to pause the virtual machine 190A-190C, disable tracing, and load the next not-yet-cached page into main memory 114. However, when tracing is disabled, any trace data in the buffer 130 can be written to the current output page, rather than dropped.

The tracing module 120 may further include a synthetic overflow module 125 that compares the amount of trace data written to the current output page against a threshold and, if the amount of trace data written to the current output page passes the threshold without the next output page being resident in main memory 114, triggers a synthetic internal buffer overflow. The threshold may be set to any value, but may be chosen to ensure that the current output page can accommodate the entirety of the internal buffer. The closer to the end of the current output page the threshold lies, the less likelihood of triggering a synthetic overflow and less trace data is lost once it occurs. In one embodiment, the threshold is set at half the size of the current output page that uses the analysis of a single bit to determine if data has been written to the latter half of the current output page. In another embodiment, the threshold is set at 75% of the size of the current output page.

Upon trigger of the synthetic overflow, the tracing module 120 inserts packets into the current output page indicating packet loss rather than packets of trace data. When the next output page is resident in main memory 114, the tracing module 120 inserts packets indicating that trace data will follow and inserts generated trace data. Debugging software may be able to interpret the packets indicating data loss and communicate this to the user and provide a partial, incomplete trace rather than no trace information due to a corrupted trace.

Figure 2:
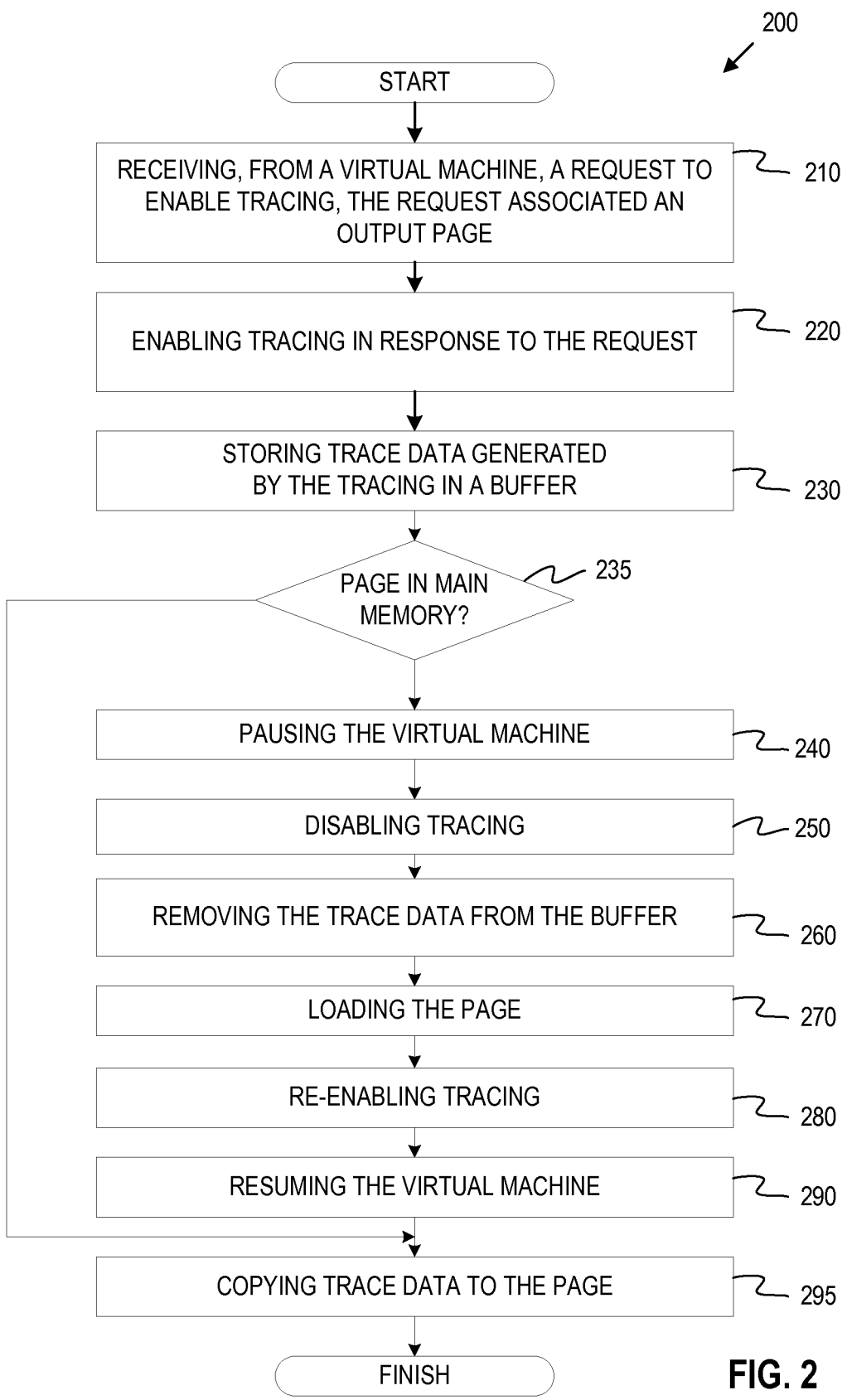
FIG. 2 is a flow diagram illustrating a method of storing tracing data for a virtual machine, according to an embodiment of the disclosure.

FIG. 2 is a flow diagram illustrating a method of storing tracing data (also referred to as trace data) for a virtual machine, according to an embodiment of the disclosure. The method 200 may be performed by processing logic that may include hardware (e.g., circuitry, dedicated logic, programmable logic, microcode, etc.), software (e.g., instructions executed by a processing device), firmware or a combination thereof. For example, the method 200 may be performed by the processor 112 of FIG. 1.

The method 200 begins at block 210 with processing logic receiving, from a virtual machine, a request to enable tracing, the request associated with an output page. The request may be received from an application, such as a debugging application, of the virtual machine. The request may be received from a guest operating system of the virtual machine. The request may be associated with one or more output page. However, for simplicity of explanation of the method 200 of FIG. 2, the method 200 is described with respect to a single output page. In one embodiment, the request indicates a virtual memory address that maps to a physical memory address of the output page.

At block 220, the processing logic enables tracing in response to the request. In one embodiment, enabling tracing includes setting a value of a trace register to indicate that tracing is enabled. For example, in one embodiment, the tracing register stores a '1' to indicate that tracing is enabled and stores a '0' to indicate that tracing is disabled. In one embodiment, while tracing is enabled, the processing logic generates trace data regarding the software executed by the processing logic. The processing logic may include a tracing module that generates the trace data.

At block 230, the processing logic stores trace data generated by the tracing in an internal buffer. The buffer may be separate from a main memory and from a secondary storage. The buffer may be a size significantly less than a size of the output page. For example, in one embodiment, the size of the output page may be at least 4 kilobytes and the size of the buffer may be less than or equal to one kilobyte. Alternatively, the buffer may have a larger size.

At block 235, the processing logic determines whether the output page is resident in main memory. If the output page is resident in main memory, the method 200 skips to block 295 where the processing logic copies the trace data to the output page in main memory. If the output page is not resident in main memory, a tracing page fault occurs and the method 200 continues to block 240. When a tracing page fault occurs, a memory management unit may generate a page fault exception to be received and handled by software executed by the processing logic (e.g., by a hypervisor executed by the processing logic).

At block 240, the processing logic pauses the virtual machine. The virtual machine may be paused by a hypervisor, executed by the processing logic that monitors and/or manages the virtual machine.

At block 250, the processing logic disables tracing. In one embodiment, disabling tracing may include storing a value in a trace register indicating the tracing is disabled. While tracing is disabled, the processing logic does not generate trace data regarding the software executed by the processing logic. Thus, while tracing is disabled, the processing logic does not generate trace data regarding the hypervisor or other non-virtual machine software executed by the processing logic.

At block 260, the trace data is removed from the buffer. In one embodiment, the trace data is lost. Because the trace data is removed from the buffer without being copied to main memory, the trace may be incomplete or corrupted. In some embodiments, the virtual machine (or software running on the virtual machine) may detect that the trace is corrupted. In response, the virtual machine may re-run the trace.

At block 270, the output page determined to be not resident in main memory is loaded into the main memory. In one embodiment, the output page is loaded into the main memory by a hypervisor. In one embodiment, the output page is loaded into the main memory by a memory management unit (MMU) in response to an instruction from the processing logic (e.g., from the hypervisor executed by the processing logic).

At block 280, the processing logic re-enables tracing. Re-enabling the tracing may include writing a value to a trace register indicating that tracing is enabled. As mentioned above, while tracing is enabled, the processing logic generates trace data regarding the software executed by the processing logic.

At block 290, the processing logic resumes the virtual machine. The virtual machine may be resumed by the hypervisor.

At block 295, the trace data from the buffer is copied to the output page which is resident in main memory. From the output page in main memory, the trace data may be accessed by the virtual machine (e.g., by a debugging application running on the virtual machine) to be analyzed or presented to a user for interpretation.

Figure 3:
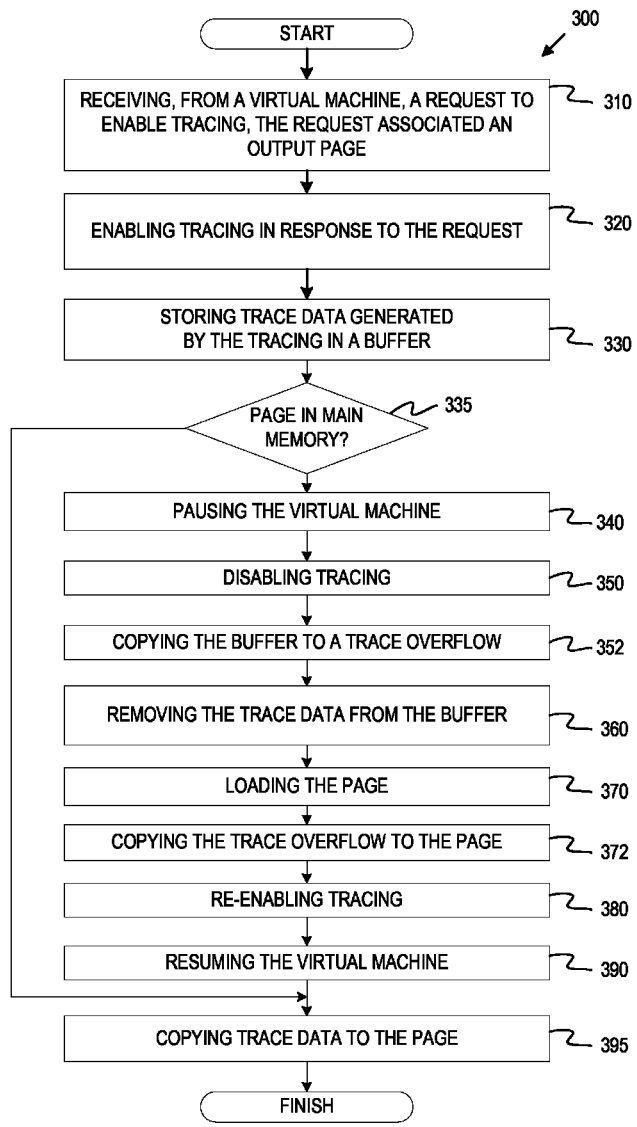
FIG. 3 is a flow diagram illustrating a method of storing tracing data for a virtual machine in a temporary trace storage buffer (TTSB), according to an embodiment of the disclosure.

FIG. 3 is a flow diagram illustrating a method of storing tracing data for a virtual machine in a TTSB, according to an embodiment of the disclosure. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed by the processor 112 of FIG. 1.

The method 300 begins at block 310 with processing logic receiving, from a virtual machine, a request to enable tracing, the request associated with an output page. The request may be received from an application, such as a debugging application, of the virtual machine. The request may be received from a guest operating system of the virtual machine. The request may be associated with one or more output page. However, for simplicity of explanation of the method 300 of FIG. 3, the method 300 is described with respect to a single output page. In one embodiment, the request indicates a virtual memory address that maps to a physical memory address of the output page.

At block 320, the processing logic enables tracing in response to the request. In one embodiment, enabling tracing includes setting a value of a trace register to indicate that tracing is enabled. For example, in one embodiment, the tracing register stores a '1' to indicate that tracing is enabled and stores a '0' to indicate that tracing is disabled. In one embodiment, while tracing is enabled, the processing logic generates trace data regarding the software executed by the processing logic. The processing logic may include a tracing module that generates the trace data.

At block 330, the processing logic stores trace data generated by the tracing in a buffer. The buffer may be separate from a main memory and from a secondary storage. The buffer may be a size significantly less than a size of the output page. For example, in one embodiment, the size of the output page may be at least 4 kilobytes and the size of the buffer may be less than or equal to one kilobyte.

At block 335, the processing logic determines whether the output page is resident in main memory. If the output page is resident in main memory, the method 300 skips to block 395 where the processing logic copies the trace data to the output page in main memory. If the output page is not resident in main memory, a tracing page fault occurs and the method 300 continues to block 340. When a tracing page fault occurs, a memory management unit may generate a page fault exception to be received and handled by software executed by the processing logic (e.g., by a hypervisor executed by the processing logic).

At block 340, the processing logic pauses the virtual machine. The virtual machine may be paused by a hypervisor, executed by the processing logic, that monitors and/or manages the virtual machine.

At block 350, the processing logic disables tracing. In one embodiment, disabling tracing may include storing a value in a trace register indicating the tracing is disabled. While tracing is disabled, the processing logic does not generate trace data regarding the software executed by the processing logic. Thus, while tracing is disabled, the processing logic does not generate trace data regarding the hypervisor or other non-virtual machine software executed by the processing logic.

At block 352, the processing logic copies the trace data in the buffer to a TTSB. In one embodiment, the TTSB may be a separate buffer (e.g., hardware such as random access memory (RAM) or another storage device). The TTSB may be part of the tracing module 120 of the processor 112 of FIG. 1. In another embodiment, the TTSB is a dedicated block of memory the hypervisor keeps resident in the main memory. The size of the TTSB block may be equal to the size of the buffer. In another embodiment, the size of the TTSB block is greater than or less than the size of the buffer. In one embodiment, the size of the TTSB block is less than the size of the output page. In one embodiment, multiple TTSBs are present, each assigned to a different virtual machine. In another embodiment, a single TTSB is used for multiple virtual machines. In such an embodiment, the hypervisor may ensure that it does not transfer control of the processing logic to a second virtual machine while trace data for a first virtual machine is present in the TTSB.

At block 360, the trace data is removed from the buffer. Because the trace data is copied to the TTSB in block 352, the trace data is not lost.

At block 370, the output page determined to be not resident in main memory is loaded into the main memory. In one embodiment, the output page is loaded into the main memory by a hypervisor. In one embodiment, the output page is loaded into the main memory by a memory management unit (MMU) in response to an instruction from the processing logic (e.g., from the hypervisor executed by the processing logic).

At block 372, the trace data stored in the TTSB is copied to the output page. The trace data stored in the TTSB may be copied to the output page by the hypervisor or by hardware of the processing logic.

At block 380, the processing logic re-enables tracing. Re-enabling the tracing may include writing a value to a trace register indicating that tracing is enabled. As mentioned above, while tracing is enabled, the processing logic generates trace data regarding the software executed by the processing logic.

At block 390, the processing logic resumes the virtual machine. The virtual machine may be resumed by the hypervisor.

At block 395, the trace data from the buffer is copied to the output page which is resident in main memory. From the output page in main memory, the trace data may be accessed by the virtual machine (e.g., by a debugging application running on the virtual machine) to be analyzed or presented to a user for interpretation.

Figure 4:
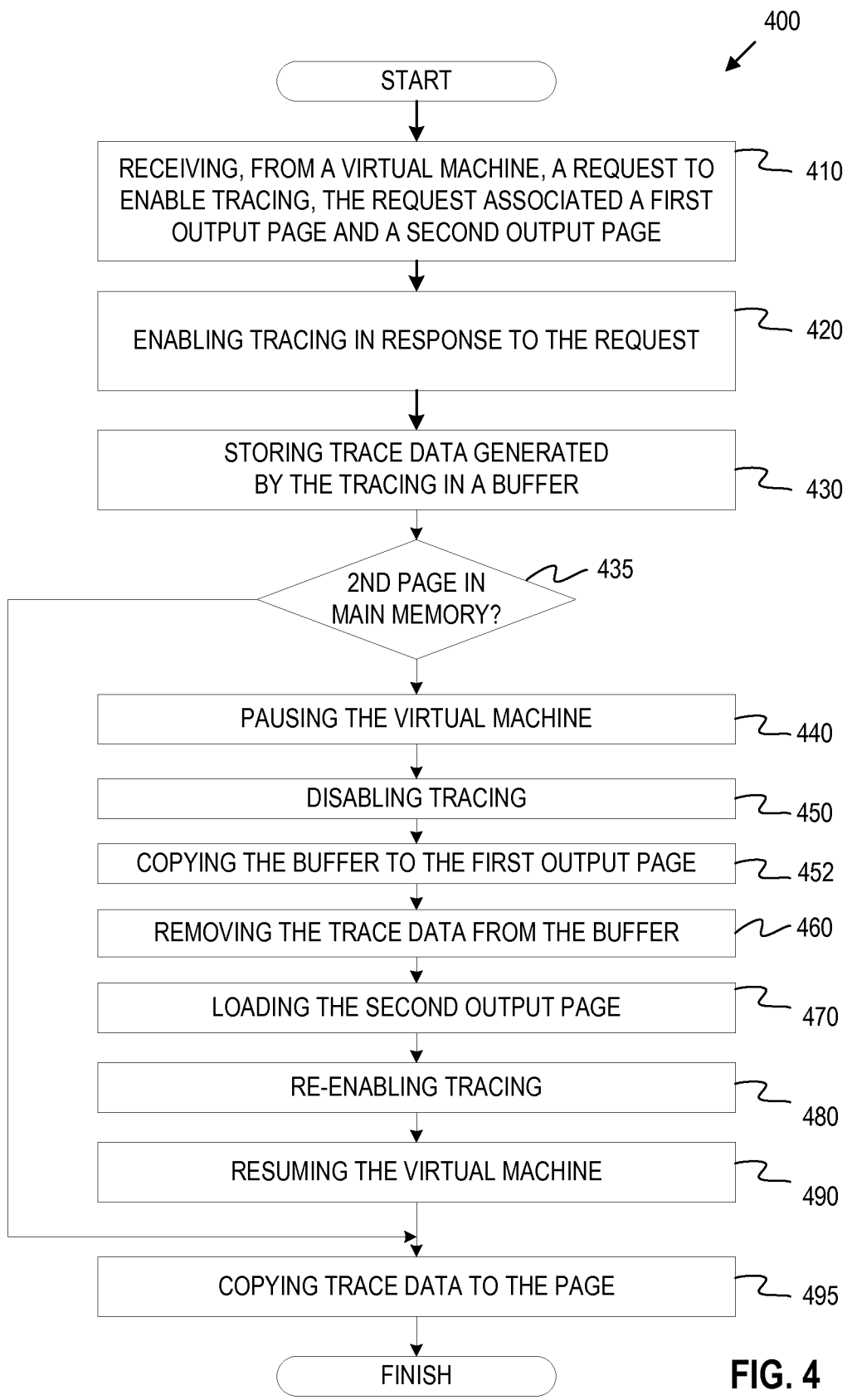
FIG. 4 is a flow diagram illustrating a method of storing tracing data for a virtual machine with early page look-up, according to an embodiment of the disclosure.

FIG. 4 is a flow diagram illustrating a method 400 of storing tracing data for a virtual machine with early page look-up, according to an embodiment of the disclosure. The method 400 may be performed by processing logic that may include hardware (e.g., circuitry, dedicated logic, programmable logic, microcode, etc.), software (e.g., instructions executed by a processing device), firmware or a combination thereof. For example, the method 400 may be performed by the processor 112 of FIG. 1.

The method 400 begins at block 410 with processing logic receiving, from a virtual machine, a request to enable tracing, the request associated with a first output page and a second output page. The request may be received from an application, such as a debugging application, of the virtual machine. The request may be received from a guest operating system of the virtual machine. The request may be associated with more than two output pages. However, for simplicity of explanation of the method 400 of FIG. 4, the method 400 is described with respect to two output pages. In one embodiment, the request indicates at least two virtual memory addresses that map to physical memory addresses of the first output page and the second output page.

At block 420, the processing logic enables tracing in response to the request. In one embodiment, enabling tracing includes setting a value of a trace register to indicate that tracing is enabled. For example, in one embodiment, the tracing register stores a '1' to indicate that tracing is enabled and stores a '0' to indicate that tracing is disabled. In one embodiment, while tracing is enabled, the processing logic generates trace data regarding the software executed by the processing logic. The processing logic may include a tracing module that generates the trace data.

At block 430, the processing logic stores trace data generated by the tracing in a buffer. The buffer may be separate from a main memory and from a secondary storage. The buffer may be a size significantly less than a size of the output page. For example, in one embodiment, the size of the output page may be at least 4 kilobytes and the size of the buffer may be less than or equal to one kilobyte.

At block 435, the processing logic determines whether the second output page is resident in main memory. For simplicity of explanation of the method 400 of FIG. 4, it is assumed that the first output page is resident in main memory. If the first output page is not resident in main memory, the processing logic may determine that the first output page is not resident in main memory and load the first output page into the main memory before tracing is enabled in block 420.

If the second output page is resident in main memory, the method 400 skips to block 495 where the processing logic copies the trace data to at least one of the first output page or the second output page. Thus, in one embodiment, the processing logic determines whether the second output page is resident in main memory before copying trace data to the first output page. Similarly, in the case of a request associated with more than two output pages, the processing logic may determine whether a third output page is resident in main memory before copying trace data to the second output page.

If the second output page is not resident in main memory, an early tracing page fault occurs and the method 400 continues to block 440. When a tracing page fault occurs, a memory management unit may generate a page fault exception to be received and handled by software executed by the processing logic (e.g., by a hypervisor executed by the processing logic).

At block 440, the processing logic pauses the virtual machine. The virtual machine may be paused by a hypervisor, executed by the processing logic, that monitors and/or manages the virtual machine.

At block 450, the processing logic disables tracing. In one embodiment, disabling tracing may include storing a value in a trace register indicating the tracing is disabled. While tracing is disabled, the processing logic does not generate trace data regarding the software executed by the processing logic. Thus, while tracing is disabled, the processing logic does not generate trace data regarding the hypervisor or other non-virtual machine software executed by the processing logic.

At block 452, the processing logic copies the trace data in the buffer to the first output page.

At block 460, the trace data is removed from the buffer. Because the trace data is copied to the first output page in block 452, the trace data is not lost.

At block 470, the second output page determined to be not resident in main memory is loaded into the main memory. In one embodiment, the second output page is loaded into the main memory by a hypervisor. In one embodiment, the second output page is loaded into the main memory by a memory management unit (MMU) in response to an instruction from the processing logic (e.g., from the hypervisor executed by the processing logic).

At block 480, the processing logic re-enables tracing. Re-enabling the tracing may include writing a value to a trace register indicating that tracing is enabled. As mentioned above, while tracing is enabled, the processing logic generates trace data regarding the software executed by the processing logic.

At block 490, the processing logic resumes the virtual machine. The virtual machine may be resumed by the hypervisor.

At block 495, the trace data from the buffer is copied to at least one of the first output page or the second output page, now resident in main memory. From the output page in main memory, the trace data may be accessed by the virtual machine (e.g., by a debugging application running on the virtual machine) to be analyzed or presented to a user for interpretation.

Figure 5:
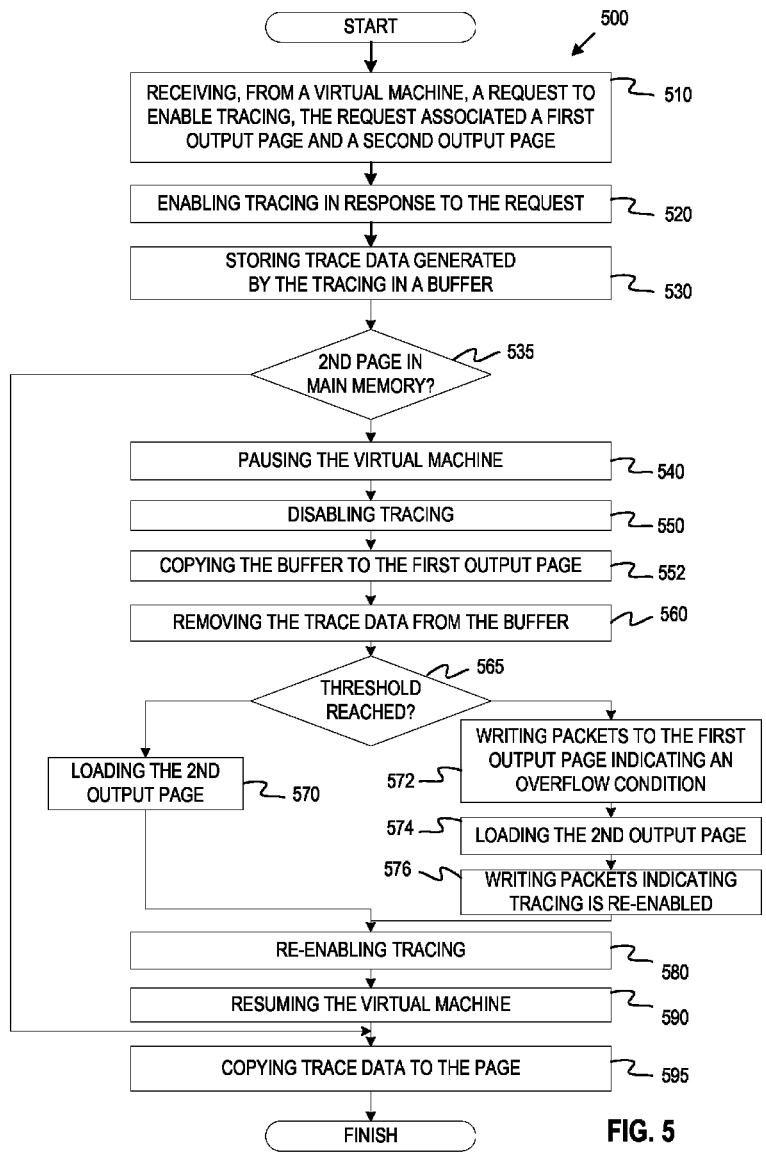
FIG. 5 is a flow diagram illustrating a method of storing tracing data for a virtual machine with a synthetic overflow, according to an embodiment of the disclosure.

FIG. 5 is a flow diagram illustrating a method 500 of storing tracing data for a virtual machine with a synthetic overflow, according to an embodiment of the disclosure. The method 500 may be performed by processing logic that may include hardware (e.g., circuitry, dedicated logic, programmable logic, microcode, etc.), software (e.g., instructions executed by a processing device), firmware or a combination thereof. For example, the method 500 may be performed by the processor 112 of FIG. 1.

The method 500 begins at block 510 with processing logic receiving, from a virtual machine, a request to enable tracing, the request associated with a first output page and a second output page. The request may be received from an application, such as a debugging application, of the virtual machine. The request may be received from a guest operating system of the virtual machine. The request may be associated with more than two output pages. However, for simplicity of explanation of the method 500 of FIG. 5, the method 500 is described with respect to two output pages. In one embodiment, the request indicates at least two virtual memory addresses that map to physical memory addresses of the first output page and the second output page.

At block 520, the processing logic enables tracing in response to the request. In one embodiment, enabling tracing includes setting a value of a trace register to indicate that tracing is enabled. For example, in one embodiment, the tracing register stores a '1' to indicate that tracing is enabled and stores a '0' to indicate that tracing is disabled. In one embodiment, while tracing is enabled, the processing logic generates trace data regarding the software executed by the processing logic. The processing logic may include a tracing module that generates the trace data.

At block 530, the processing logic stores trace data generated by the tracing in a buffer. The buffer may be separate from a main memory and from a secondary storage. The buffer may be a size significantly less than a size of the output page. For example, in one embodiment, the size of the output page may be at least 4 kilobytes and the size of the buffer may be less than or equal to one kilobyte.

At block 535, the processing logic determines whether the second output page is resident in main memory. For simplicity of explanation of the method 500 of FIG. 5, it is assumed that the first output page is resident in main memory. If the first output page is not resident in main memory, the processing logic may determine that the first output page is not resident in main memory and load the first output page into the main memory before tracing is enabled in block 520.

If the second output page is resident in main memory, the method 500 skips to block 595 where the processing logic copies the trace data to at least one of the first output page or the second output page. Thus, in one embodiment, the processing logic determines whether the second output page is resident in main memory before copying trace data to the first output page. Similarly, in the case of a request associated with more than two output pages, the processing logic may determine whether a third output page is resident in main memory before copying trace data to the second output page.

If the second output page is not resident in main memory, a tracing page fault occurs and the method 500 continues to block 540. When a tracing page fault occurs, a memory management unit may generate a page fault exception to be received and handled by software executed by the processing logic (e.g., by a hypervisor executed by the processing logic).

In one embodiment, determining whether the second output page is resident in main memory includes checking whether the TTLB includes an entry referencing the second output page. Thus, in one embodiment, it may be determined that the second output page is not resident in main memory based on the TTLB not including an entry referencing the second output page even if the second page is resident in main memory.

At block 540, the processing logic pauses the virtual machine. The virtual machine may be paused by a hypervisor, executed by the processing logic, that monitors and/or manages the virtual machine.

At block 550, the processing logic disables tracing. In one embodiment, disabling tracing may include storing a value in a trace register indicating the tracing is disabled. While tracing is disabled, the processing logic does not generate trace data regarding the software executed by the processing logic. Thus, while tracing is disabled, the processing logic does not generate trace data regarding the hypervisor or other non-virtual machine software executed by the processing logic.

At block 552, the processing logic copies the trace data in the buffer to the first output page.

At block 560, the trace data is removed from the buffer. Because the trace data is copied to the first output page in block 552, the trace data is not lost.

At block 570 (and at block 574), the second output page is loaded into the main memory. In one embodiment, the second output page is loaded into the main memory by a hypervisor. In one embodiment, the second output page is loaded into the main memory by a memory management unit (MMU) in response to an instruction from the processing logic (e.g., from the hypervisor executed by the processing logic).

However, pausing the virtual machine and loading the second page into the main memory may not be instantaneous. While waiting for these processes to occur, additional trace data may be generated, copied to the buffer, and copied to the first output page. If the first output page becomes full before the virtual machine is paused and the second page is loaded into the main memory, trace data may be lost. To alert the virtual machine of such an occurrence, an overflow condition may be indicated.

Thus, at block 565, prior to loading the second output page into main memory in block 570 or block 574, the processing logic determines if a threshold amount of data has been copied to the first output page. In one embodiment, the threshold is fifty percent of size of the page. In another embodiment, the threshold is 75 percent of the size of the page. The threshold may be any size.

Although block 565 is shown in FIG. 5 as a single determination occurring after tracing is disabled in block 550 and data in the buffer is copied to the first output page in block 552, it is to be appreciated that, as noted above, these processes may not be instantaneous. Thus, determining whether the threshold is reached in block 565 may be performed multiple times as data is copied from the buffer to the first output page, even as additional tracing data is generated before tracing is disabled in block 550.

For example, once is it determined that the second output page is not resident in main memory (in block 535), a command to pause the virtual machine and disable tracing (as described in blocks 540 and 550) may be generated. While the command is processed, the processing logic may copy data from the buffer to the first output page and check the threshold. While the command is being processed, the processing logic may generate additional trace data and copy the additional trace data from the buffer to the first output page and check the threshold. Thus, once it is determined that the second output page is not resident in main memory, every copying of the buffer to the first output page may trigger a check of the threshold and, if the threshold has been reached, trigger an overflow condition as described below.

If the processing logic determines that the threshold has not been reached, the processing logic continues to load the second output page in block 570. If the processing logic determines that the threshold has been reached, the processing logic writes packets to the first output page indicating an overflow condition. Thus, the processing logic writes packets into the current output page indicating packet loss rather than packets of trace data. Further, the processing logic ceases generating new packets, until the second output page is resident and the synthetic overflow is cleared.

In one embodiment, the processing logic writes the packets indicating the overflow condition only after a complete packet of trace data. Thus, the processing logic writes the packets indicating the overflow condition after a complete packet of trace data (as opposed to a partial packet of trace data) causes the first output page to have at least the threshold amount of data.

At block 574, the second output page is loaded into the main memory. At block 576, the processing logic writes packets into at least one of the first output page or the second output page indicating that the synthetic overflow is cleared, and packet generation may resume.

At block 580, the processing logic re-enables tracing. Re-enabling the tracing may include writing a value to a trace register indicating that tracing is enabled. As mentioned above, while tracing is enabled, the processing logic generates trace data regarding the software executed by the processing logic. Because the second output page is now resident in memory, the synthetic overflow assertion is cleared, and packet generation resumes.

At block 590, the processing logic resumes the virtual machine. The virtual machine may be resumed by the hypervisor.

At block 595, the trace data from the buffer is copied to at least one of the first output page or the second output page, now resident in main memory. From the output page in main memory, the trace data may be accessed by the virtual machine (e.g., by a debugging application running on the virtual machine) to be analyzed or presented to a user for interpretation.

Figure 6:
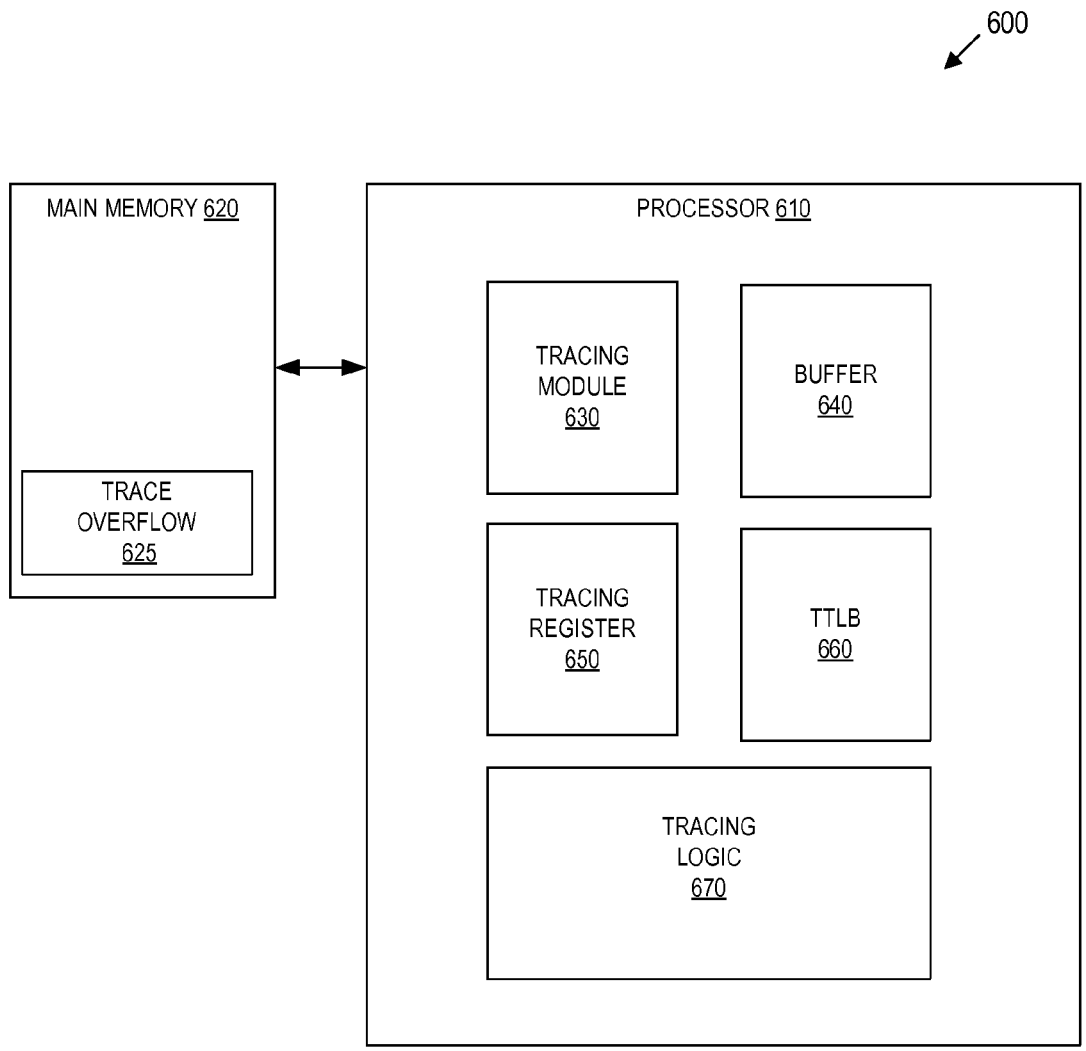
FIG. 6 is a functional block diagram of a tracing system.

FIG. 6 is a functional block diagram of a tracing system 600. The tracing system 600 includes a processor 610 coupled to main memory 620. The processor 600 includes a tracing register 650 to store a value indicative of whether tracing is enabled or disabled. The processor 600 further includes a tracing module 630 to generate trace data while tracing is enabled. For example, the tracing module 630 may read the tracing register 650 to determine whether or not to generate trace data. When the tracing register 650 stores a value indicating that tracing is enabled, the tracing module 630 may generate trace data. The processor 600 further includes a buffer 640 to store the trace data generated by the tracing module 630.

The processor 600 includes tracing logic 670 to perform a variety of functions. The tracing logic 670 may include a number of separate modules or may be integrated into a single module. The tracing logic 670 may be implemented as dedicated hardware or general hardware configurable by microcode to perform the functions described below. The tracing logic 670 may include logic to write a value to the tracing register 650 indicated that tracing is enabled in response to a request from a virtual machine. The request from the virtual machine may be a request to enable tracing. The request from the virtual machine may be associated with an output page. The request from the virtual machine may be associated with a first output page and a second output page. In one embodiment, the request from the virtual machine is further associated with a third output page and/or additional output pages.

The tracing logic 670 may include logic to determine that the output page is not resident in the main memory 620. The tracing logic 670 may determine that the output page is not resident in the main memory 620 in response to a page fault exception from a memory management unit (MMU). The tracing logic 670 may include logic to copy the trace data in the buffer 640 to a TTSB 625 in response to a determination that the output page is not resident in the main memory 620. In one embodiment (as shown in FIG. 6), the TTSB 625 is a dedicated block of memory of the main memory 620. In another embodiment, the TTSB 625 is a storage device that is separate from the main memory 620. The storage device may be part of the processor 610 or separate from, but coupled to, the processor 610. In one embodiment, a size of the TTSB 625 (e.g., in bytes) is less than a size of the output page.

The tracing logic 670 may further include logic to, in response to a determination that the output page is not resident in the main memory 620, pause the virtual machine, write a value to the tracing register 650 indicating that tracing is disabled, and remove the trace data from the buffer 640. The tracing logic may include logic to, in response to a determination that the output page is not resident in the main memory 620, load the output page into the main memory 620, write a value to the tracing register 650 indicating that tracing is enabled, and resume the virtual machine.

The processor 600 may further include a trace translation lookaside buffer (TTLB) 660. When the request from the virtual machine is associated with a first output page and a second output page, the TTLB 660 may store a first trace output page translation of the first output page and a second output page translation of the second output page. In one embodiment, the TTLB 660 stores a third trace output page translation of a third output page associated with the request from the virtual machine.

The tracing logic 670 may include logic to determine that the second output page is not resident in the main memory 620. The tracing logic 670 may further include logic to copy the trace data in the buffer 640 to the first output page in response to a determination that the second output page is not resident in the main memory 620.

The tracing logic 670 may include logic to, in response to a determination that the second output page is not resident in the main memory 620, pause the virtual machine, write a value to the tracing register 650 indicating that tracing is disabled, and remove the trace data from the buffer 640. The tracing logic 670 may include logic to, in response to a determination that the second output page is not resident in the main memory 620, load the second output page into the main memory 620, write a value to the tracing register 650 indicating that tracing is enabled, and resume the virtual machine.

The tracing logic 670 may include logic to determine that the first output page includes at least a threshold level of data and signal a synthetic internal buffer overflow, ceasing new packet generation after writing packets to the first output page indicating the overflow condition. In one embodiment, the threshold level of data is half a size of the first output page (e.g., in bytes). The tracing logic 670 may further include logic to load the second output page into the main memory, write packets to at least one of the first output page or the second output page indicating that tracing is re-enabled, and write a value to the tracing register 650 indicating that tracing is enabled.

Figure 7:
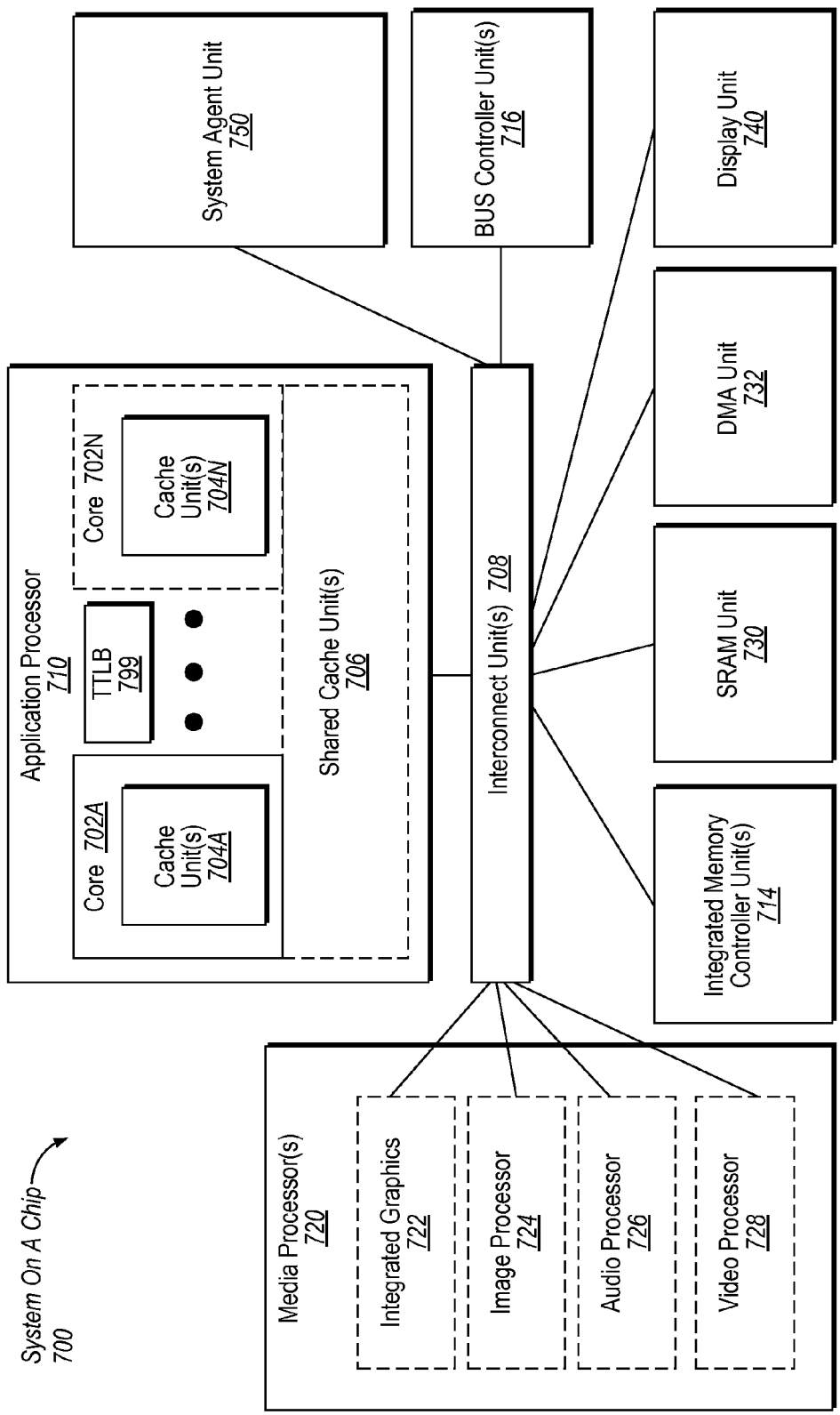
FIG. 7 is a block diagram of a system on chip (SoC), in accordance with an embodiment of the present disclosure.

FIG. 7 is a block diagram of a SoC 700 in accordance with an embodiment of the present disclosure. Dashed lined boxes are optional features on more advanced SoCs. In FIG. 7, an interconnect unit(s) 708 is coupled to: an application processor 710 which includes a set of one or more cores 702A-702N and shared cache unit(s) 706; a system agent unit 750; a bus controller unit(s) 716; an integrated memory controller unit(s) 714; a set of one or more media processors 720 which may include integrated graphics logic 722, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, the application processor 710 includes the processor 112 of FIG. 1. The application processor 710 includes a trace translation lookaside buffer 799 which may correspond to the TTLB 128 of FIG. 1.

The memory hierarchy includes one or more levels of cache within the cores, a set of one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-702N are capable of multi-threading.

The system agent 750 includes those components coordinating and operating cores 702A-702N. The system agent unit 750 may include for example a power control unit (PCU) and a display unit. The PCU may be or include logic and components needed for regulating the power state of the cores 702A-702N and the integrated graphics logic 708. The display unit 740 is for driving one or more externally connected displays.

The cores 702A-702N may be homogenous or heterogeneous in terms of architecture and/or instruction set. For example, some of the cores 702A-702N may be in order while others are out-of-order. As another example, two or more of the cores 702A-702N may be capable of execution of the same instruction set, while others may be capable of executing only a subset of that instruction set or a different instruction set.

The application processor 710 may be a general-purpose processor, such as a Core™ i3, i5, i7, 2 Duo and Quad, Xeon™, Xeon-Phi™, Itanium™, XScale™ or StrongARM™ processor, which are available from Intel Corporation, of Santa Clara, Calif. Alternatively, the application processor 710 may be from another company, such as ARM Holdings, Ltd, MIPS, etc. The application processor 710 may be a special-purpose processor, such as, for example, a network or communication processor, compression engine, graphics processor, co-processor, embedded processor, or the like. The application processor 710 may be implemented on one or more chips. The application processor 710 may be a part of and/or may be implemented on one or more substrates using any of a number of process technologies, such as, for example, BiCMOS, CMOS, or NMOS.

Figure 8:
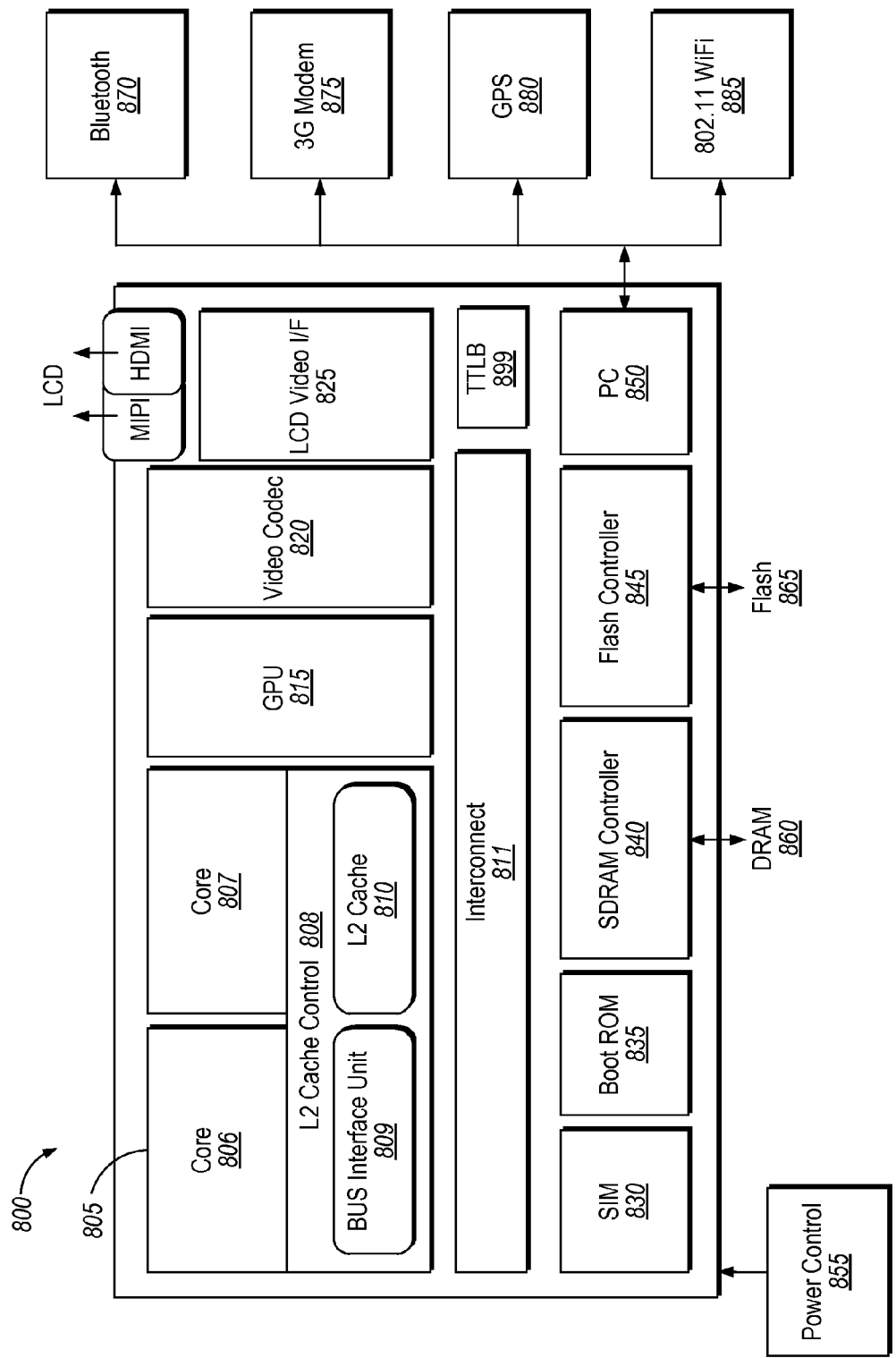
FIG. 8 is a block diagram of an embodiment of a system on-chip (SoC) design, in accordance with another embodiment of the present disclosure.

FIG. 8 is a block diagram of an embodiment of a system on-chip (SOC) design in accordance with the present disclosure. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, the SOC 800 may include the processor 112 of FIG. 1. The SOC 800 includes a trace translation lookaside buffer 899 which may correspond to the TTLB 128 of FIG. 1.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnect discussed above, which potentially implements one or more aspects of the described disclosure.

Interface 811 provides communication channels to the other components, such as a Subscriber Identity Module (SIM) 830 to interface with a SIM card, a boot ROM 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system 800 illustrates peripherals for communication, such as a Bluetooth module 870, 3G modem 875, GPS 880, and Wi-Fi 885. Note as stated above, a UE includes a radio for communication. As a result, these peripheral communication modules are not all required. However, in a UE, some form a radio for external communication is to be included.

Figure 9:
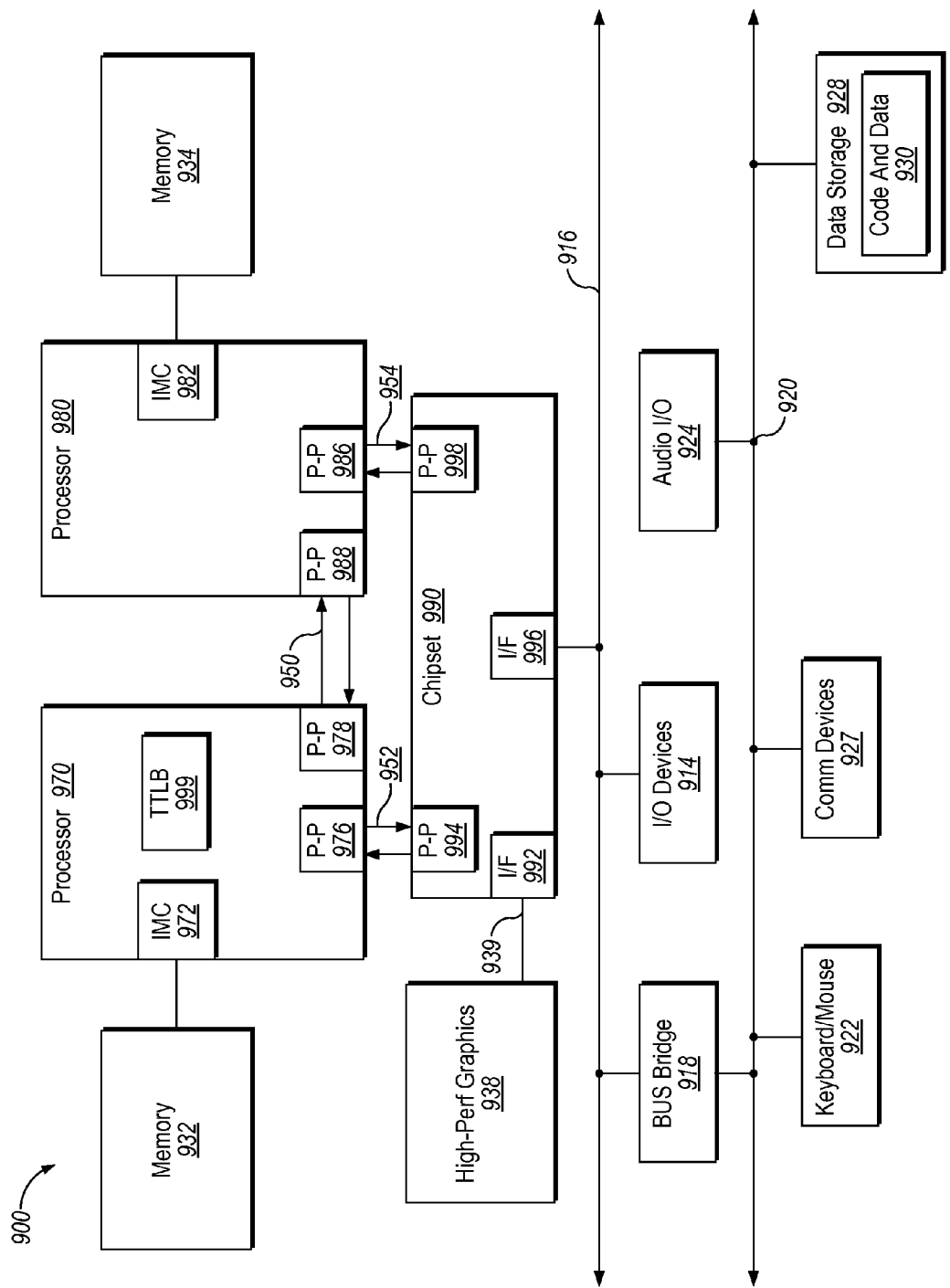
FIG. 9 is a block diagram of a computer system, according to one embodiment of the present disclosure.

FIG. 9 is a block diagram of a multiprocessor system 900 in accordance with an implementation. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 112 of FIG. 1. The processor 970 includes a trace translation lookaside buffer 999 which may correspond to the TTLB 128 of FIG. 1. As shown in FIG. 9, each of processors 970 and 980 may be multicore processors, including first and second processor cores, although potentially many more cores may be present in the processors. A processor core may also be referred to as an execution core.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, and 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
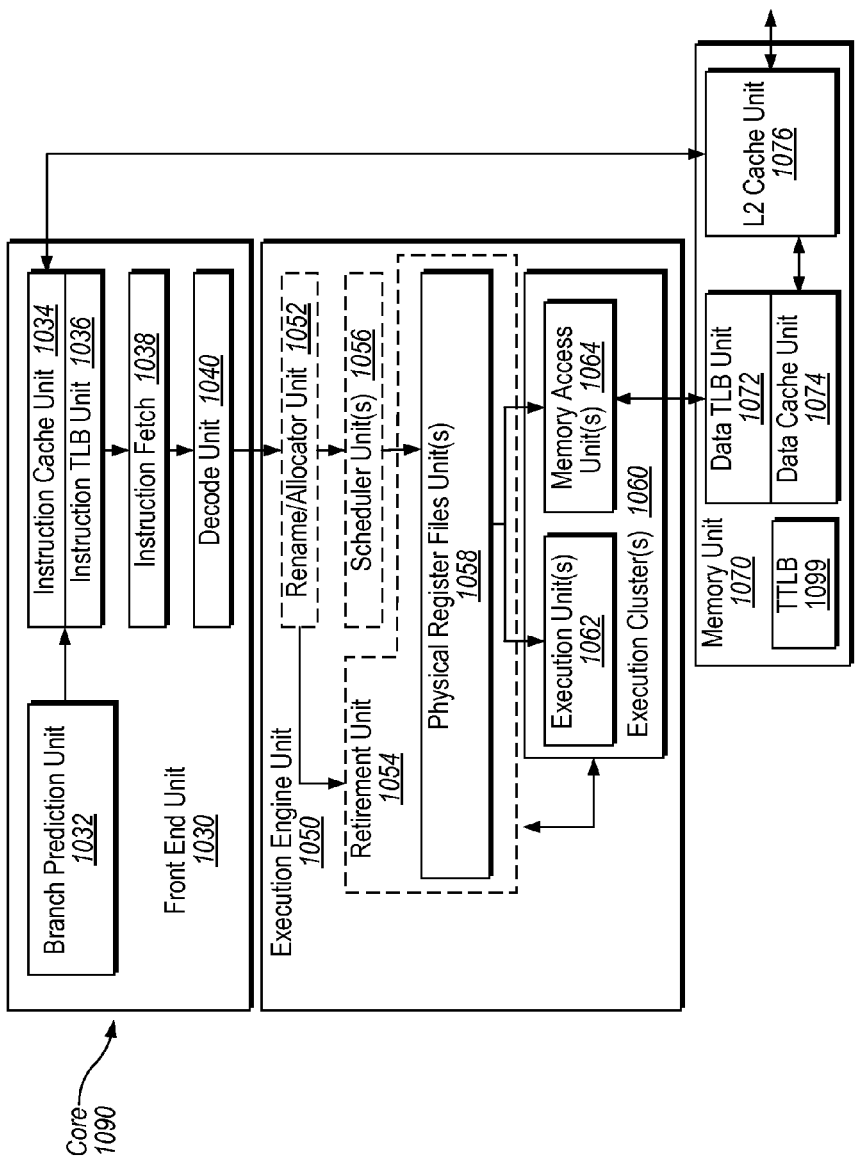
FIG. 10A is a block diagram illustrating an in-order pipeline and a register renaming stage, out-of-order issue/execution pipeline implemented by a processor core, in accordance with one embodiment of the present disclosure.
FIG. 10B is a block diagram illustrating an in-order architecture core and a register renaming logic, out-of-order issue/execution logic to be included in a processor according to at least one embodiment of the disclosure.

FIG. 10A is a block diagram illustrating an in-order pipeline and a register renaming stage, out-of-order issue/execution pipeline implemented by core 1090 of FIG. 10B (which may be include in a processor). FIG. 10B is a block diagram illustrating an in-order architecture core and a register renaming logic, out-of-order issue/execution logic that may be included in a processor according to at least one embodiment of the invention. The solid lined boxes in FIG. 10A illustrate the in-order pipeline, while the dashed lined boxes illustrates the register renaming, out-of-order issue/execution pipeline. Similarly, the solid lined boxes in FIG. 10A illustrate the in-order architecture logic, while the dashed lined boxes illustrates the register renaming logic and out-of-order issue/execution logic. In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1010, an execute stage 1016, a write back/memory write stage 1018, an exception handling stage 1022, and a commit stage 1024. In one embodiment, the processor 112 of FIG. 1 may include some or all of the functionality of the core 1090. The memory unit 1070 includes a trace translation lookaside buffer 1099 which may correspond to the TTLB 128 of FIG. 1.

FIG. 10B is a block diagram illustrating an in-order architecture core and a register renaming logic, out-of-order issue/execution logic that may be included in a processor according to at least one embodiment of the disclosure. In FIG. 10B, arrows denote a coupling between two or more units and the direction of the arrow indicates a direction of data flow between those units. FIG. 10B shows processor core 1090 including a front end unit 1030 coupled to an execution engine unit 1050, and both are coupled to a memory unit 1070.

The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to a level 2 (L2) cache unit 1076 in the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 162 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1010; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
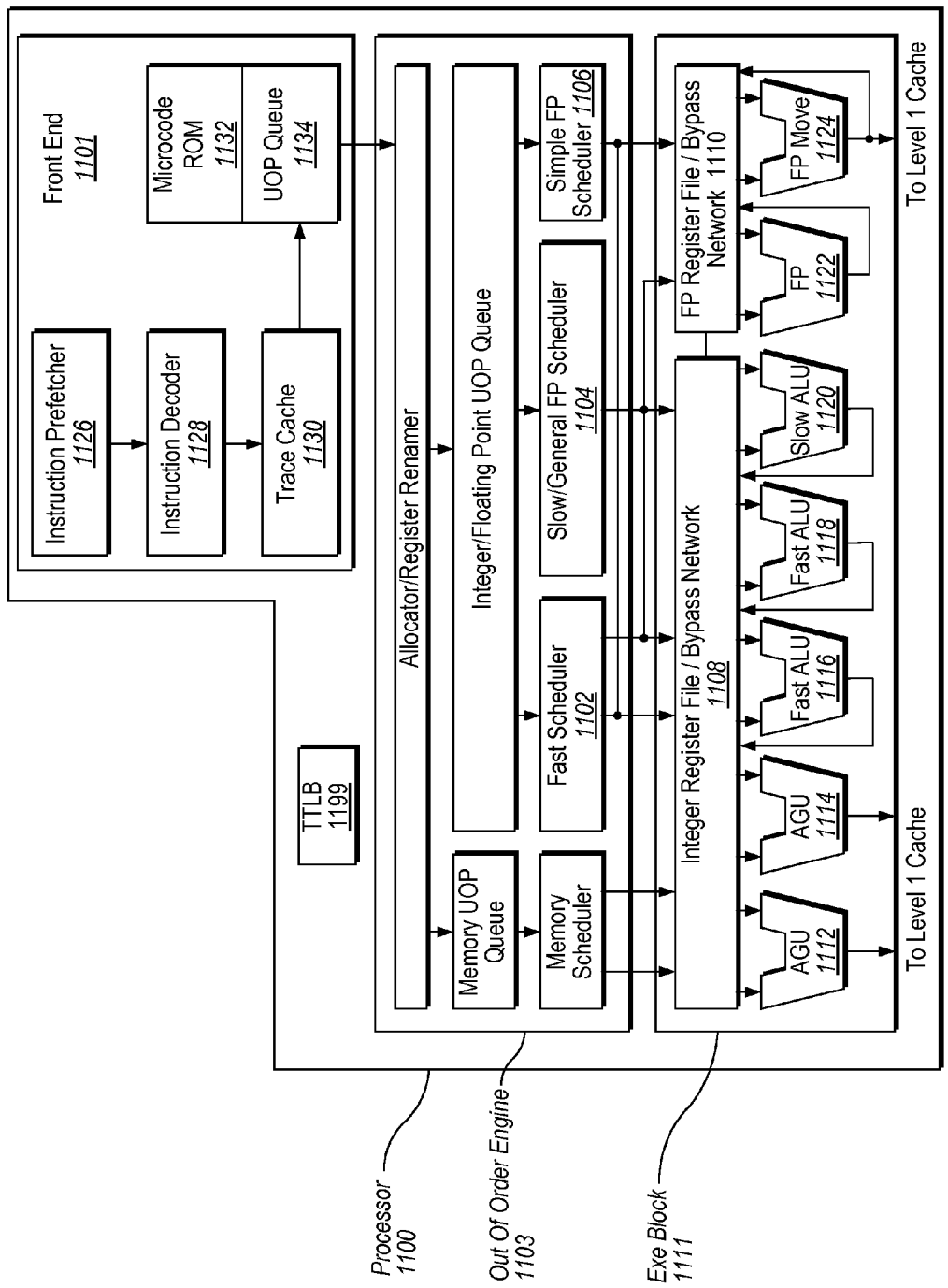
FIG. 11 is a block diagram of the micro-architecture for a processor that includes logic circuits to perform instructions, in accordance with one embodiment of the present invention.

FIG. 11 is a block diagram of the micro-architecture for a processor 1100 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation. In one embodiment, the processor 112 of FIG. 1 may include some or all of the components and functionality of the processor 1100. The processor 1100 includes a trace translation lookaside buffer 1199 which may correspond to the TTLB 128 of FIG. 1.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, and 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1122, 1124, execute floating point, MMX, SIMD, and SSE, or other operations. The floating point ALU 1122 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
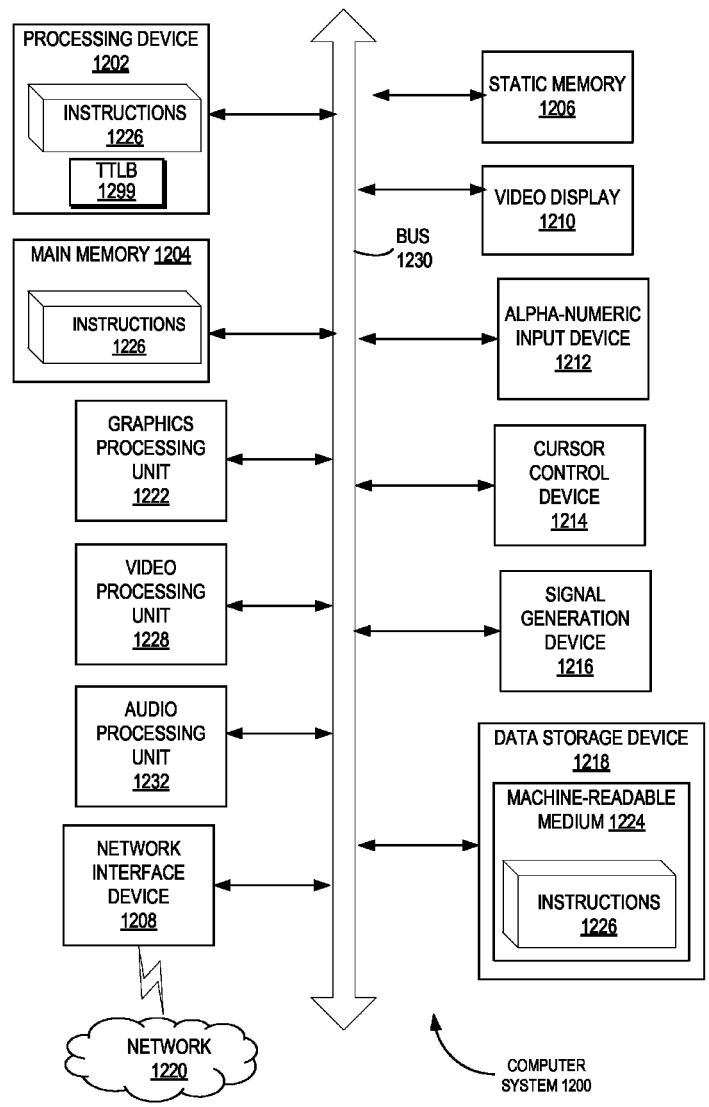
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the instructions 1226 of a mirroring logic for performing the operations discussed herein. In one embodiment, the processing device 1202 may correspond to the processor 112 of FIG. 1. The processing device 1020 includes a trace translation lookaside buffer 1299 which may correspond to the TTLB 128 of FIG. 1.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computer system 1200 may include a graphics processing unit 1222, a video processing unit 1228, and an audio processing unit 1232. In another embodiment, the computer system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 embodying any one or more of the methodologies of functions described herein. The instructions 1226 may also reside, completely or at least partially, within the main memory 1204 and/or within the processing device 1202 during execution thereof by the computer system 1200; the main memory 1204 and the processing device 1202 also constituting computer-readable storage media.

The computer-readable storage medium 1224 may also be used to store instructions 1226 utilizing logic and/or a software library containing methods that call the above applications. While the computer-readable storage medium 1224 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The following examples pertain to further embodiments.

Example 1 is a method comprising receiving, from a virtual machine, a request to enabling tracing, the request associated with one or more output pages, enabling tracing in response to the request, storing trace data generated by the tracing in an internal buffer, determining that one of the one or more output pages is not resident in main memory, and, in response to determining that the one of the one or more output page is not resident in main memory, pausing the virtual machine, disabling tracing, and removing the trace data from the internal buffer.

Example 2 may optionally extend the subject matter of example 1. In example 2, the method further comprises copying the trace data to a temporary trace storage buffer (TTSB) prior to removing the trace data from the internal buffer.

Example 3 may optionally extend the subject matter of example 2. In example 3, the method further comprises, in response to determining that the one of the one or more output pages is not resident in the main memory, loading the one of the one or more output pages into the main memory, copying the trace data from the TTSB to the one of the one or more output pages, re-enabling tracing, and resuming the virtual machine.

Example 4 may optionally extend the subject matter of any of examples 1-3. In example 4, the one or more output pages comprises a first output page and a second output page, and determining that the one of the one or more output pages is not resident in the main memory comprises determining that the second output page is not resident in the main memory. In example 4, the method further comprises copying the trace data to the first output page prior to removing the trace data from the internal buffer.

Example 5 may optionally extend the subject matter of example 4. In example 5, the method further comprises loading the second output page into the main memory, re-enabling tracing, and resuming the virtual machine.

Example 6 may optionally extend the subject matter of example 4 or 5. In example 6, the method further comprises determining that the first output page includes at least a threshold level of data, and writing packets to the first output page indicating an overflow condition in response to determining that the first output page includes at least the threshold level of data.

Example 7 may optionally extend the subject matter of example 6. In example 7, the method further comprises loading the second output page into the main memory, writing packets to at least one of the first output page or the second output page indicating that tracing is re-enabled, and re-enabling tracing.

Example 8 is a system comprising main memory and a processor coupled to the main memory. The processor comprises a tracing register to store a value indicative of whether tracing is enabled or disabled, a tracing module to generate trace data while tracing is enabled, a buffer to store the trace data, logic to write a value to the tracing register indicating that tracing is enabled in response to a request from a virtual machine, the request associated with an output page, logic to determine that the output page is not resident in the main memory, and logic to copy the trace data in the buffer to a TTSB in response to a determination that the output page is not resident in the main memory.

Example 9 may optionally extend the subject matter of example 8. In example 9, the TTSB is a dedicated block of memory of the main memory.

Example 10 may optionally extend the subject matter of example 8. In example 10, the TTSB is a storage device separate from the main memory.

Example 11 may optionally extend the subject matter of any of examples 8-10. In example 11, a size of the TTSB is less than a size of the output page.

Example 12 may optionally extend the subject matter of any of examples 8-11. In example 12, the processor further comprises logic to, in response to the determination that the output page is not resident in the main memory, pause the virtual machine, write a value to the tracing register indicating that the tracing is disabled, and remove the trace data from the buffer.

Example 13 may optionally extend the subject matter of example 12. In example 13, the processor further comprises logic to, in response to the determination that the output page is not resident in the main memory: load the output page into the main memory, write a value to the tracing register indicating that tracing is enabled, and resume the virtual machine.

Example 14 is a processor comprising a tracing register to store a value indicative of whether tracing is enabled or disabled, a tracing module to generate trace data while tracing is enabled, a buffer to store the trace data, logic to write a value to the tracing register indicating that tracing is enabled in response to a request from a virtual machine, the request associated with a first output page and a second output page, a trace translation lookaside buffer (TTLB) to store a first trace output page translation of the first output page and a second trace output page translation of the second output page, logic to determine that the second output page is not resident in a main memory, and logic to copy the trace data to the first output page in response to a determination that the second output page is not resident in the main memory.

Example 15 may optionally extend the subject matter of example 14. In example 15, the processor further comprises logic to, in response to the determination that the second output page is not resident in the main memory, pause the virtual machine, write a value to the tracing register indicating that the tracing is disabled, and remove the trace data from the buffer.

Example 16 may optionally extend the subject matter of example 15. In example 16, the processor further comprises logic to, in response to the determination that the second output page is not resident in the main memory: load the second output page into the main memory, write a value to the tracing register indicating that tracing is enabled, and resume the virtual machine.

Example 17 may optionally extend the subject matter of any of examples 14-16. In example 17, the processor further comprises logic to: determine that the first output page includes at least a threshold level of data, and write packets to the first output page indicating an overflow condition in response to determining that the first output page includes at least the threshold level of data.

Example 18 may optionally extend the subject matter of example 17. In example 18, the processor further comprises logic to: load the second output page into the main memory, write packets to at least one of the first output page or the second output page indicating that tracing is re-enabled, and write a value to the tracing register indicating that tracing is enabled.

Example 9 may optionally extend the subject matter of example 17 or 18. In example 19, the threshold level of data is half a size of the first output page.

Example 20 may optionally extend the subject matter of any of examples 14-19. In example 20, the request is further associated with a third output page and the TTLB is to store a third trace output page translation of the third output page.

Example 21 is an apparatus comprising means for receiving, from a virtual machine, a request to enabling tracing, the request associated with one or more output pages, means for enabling tracing in response to the request, means for storing trace data generated by the tracing in an internal buffer, means for determining that one of the one or more output pages is not resident in main memory, and means for, in response to determining that the one of the one or more output page is not resident in main memory, pausing the virtual machine, disabling tracing, and removing the trace data from the internal buffer.

Example 22 may optionally extend the subject matter of example 21. In example 22, the apparatus further comprises means for copying the trace data to a temporary trace storage buffer (TTSB) prior to removing the trace data from the internal buffer.

Example 23 may optionally extend the subject matter of example 22. In example 23, the apparatus further comprises means for, in response to determining that the one of the one or more output pages is not resident in the main memory: loading the one of the one or more output pages into the main memory, copying the trace data from the TTSB to the one of the one or more output pages, re-enabling tracing, and resuming the virtual machine.

Example 24 may optionally extend the subject matter of any of examples 21-23. In example 24, the one or more output pages comprises a first output page and a second output page, and determining that the one of the one or more output pages is not resident in the main memory comprises determining that the second output page is not resident in the main memory. The apparatus further comprises means for copying the trace data to the first output page prior to removing the trace data from the internal buffer.

Example 25 may optionally extend the subject matter of example 24. In example 25, the apparatus further comprises means for loading the second output page into the main memory, means for re-enabling tracing, and means for resuming the virtual machine.

Example 26 may optionally extend the subject matter of example 24 or 25. In example 26, the apparatus further comprises means for determining that the first output page includes at least a threshold level of data, and means for writing packets to the first output page indicating an overflow condition in response to determining that the first output page includes at least the threshold level of data.

Example 27 may optionally extend the subject matter of example 26. In example 27, the apparatus further comprises means for loading the second output page into the main memory, means for writing packets to at least one of the first output page or the second output page indicating that tracing is re-enabled, and means for re-enabling tracing.

Example 28 is at least one machine readable medium comprising a plurality of instructions that, in response to be executed on a computing device, cause the computing device to carry out a method according to any of examples 1-7.

Example 29 is an apparatus comprising: means for performing the method of any of examples 1-7.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processor comprising:
   a tracing register to store a value indicative of whether tracing is enabled or disabled;
   a tracing module to generate trace data while tracing is enabled;
   a buffer to store the trace data;
   logic to write a value to the tracing register indicating that tracing is enabled in response to a request from a virtual machine, the request associated with a first trace output page and a second trace output page;
   a trace translation lookaside buffer (TTLB) to store a first trace output page translation of the first trace output page and a second trace output page translation of the second trace output page;
   logic to determine that the second trace output page is not resident in a main memory;
   logic to copy the trace data to the first trace output page in the main memory in response to a determination that the second trace output page is not resident in the main memory; and
   logic to load the second trace output page into the main memory using the second trace output translation and copy the trace data from the first trace output page to the second trace output page.

2. The processor of claim 1, wherein the processor further comprises logic to, in response to the determination that the second trace output page is not resident in the main memory, pause the virtual machine, write a value to the tracing register indicating that the tracing is disabled, and remove the trace data from the buffer.

3. The processor of claim 2, wherein the processor further comprises logic to, in response to the determination that the second trace output page is not resident in the main memory:
   load the second trace output page into the main memory;
   write a value to the tracing register indicating that tracing is enabled; and
   resume the virtual machine.

4. The processor of claim 1, wherein the processor further comprises logic to:
   determine that the first trace output page includes at least a threshold level of data; and
   write packets to the first trace output page indicating an overflow condition in response to determining that the first trace output page includes at least the threshold level of data.

5. The processor of claim 4, wherein the processor further comprises logic to:
   load the second trace output page into the main memory;
   write packets to at least one of the first trace output page or the second trace output page indicating that tracing is re-enabled; and
   write a value to the tracing register indicating that tracing is enabled.

6. The processor of claim 4, wherein the threshold level of data is half a size of the first trace output page.

7. The processor of claim 1, wherein the request is further associated with a third trace output page and the TTLB is to store a third trace output page translation of the third trace output page.

8. A method comprising:
   receiving, from a virtual machine, a request to enabling tracing, the request associated with one or more trace output pages;
   enabling tracing in response to the request;
   storing trace data generated by the tracing in an internal buffer;
   determining that one of the one or more trace output pages is not resident in main memory;
   in response to determining that the one of the one or more trace output page is not resident in main memory, copying the trace data to a temporary trace storage buffer (TTSB), pausing the virtual machine, disabling tracing, and removing the trace data from the internal buffer;
   loading the one or more trace output pages not in memory into the memory; and
   copying the trace data from the TTSB to the one or more trace output pages.

9. The method of claim 8, further comprising copying the trace data to the temporary trace storage buffer (TTSB) prior to removing the trace data from the internal buffer.

10. The method of claim 9, further comprising, in response to determining that the one of the one or more trace output pages is not resident in the main memory:
    loading the one of the one or more trace output pages into the main memory;
    copying the trace data from the TTSB to the one of the one or more trace output pages;
    re-enabling tracing; and
    resuming the virtual machine.

11. The method of claim 8, wherein the one or more trace output pages comprises a first trace output page and a second trace output page, and wherein determining that the one of the one or more trace output pages is not resident in the main memory comprises determining that the second trace output page is not resident in the main memory, and further comprising:
    copying the trace data to the first trace output page prior to removing the trace data from the internal buffer.

12. The method of claim 11, further comprising:
    loading the second trace output page into the main memory;
    re-enabling tracing; and
    resuming the virtual machine.

13. The method of claim 11, further comprising:
    determining that the first trace output page includes at least a threshold level of data; and writing packets to the first trace output page indicating an overflow condition in response to determining that the first trace output page includes at least the threshold level of data.

14. The method of claim 13, further comprising:
loading the second trace output page into the main memory;
writing packets to at least one of the first trace output page or the second trace output page indicating that tracing is re-enabled; and
re-enabling tracing.

15. A system comprising:
main memory; and
a processor coupled to the main memory, the processor comprising:
  a tracing register to store a value indicative of whether tracing is enabled or disabled;
  a tracing module to generate trace data while tracing is enabled;
  a buffer to store the trace data;
  logic to write a value to the tracing register indicating that tracing is enabled in response to a request from a virtual machine, the request associated with a trace output page;
  logic to determine that the trace output page is not resident in the main memory;
  logic to copy the trace data in the buffer to a temporary trace storage buffer (TTSB) in the main memory in response to a determination that the output page is not resident in the main memory; and
  logic to load the trace output page into the memory and copy the trace data from the TTSB to the trace output page.

16. The system of claim 15, wherein the TTSB is a dedicated block of memory of the main memory.

17. The system of claim 15, wherein the TTSB is a storage device separate from the main memory.

18. The system of claim 15, wherein a size of the TTSB is less than a size of the trace output page.

19. The system of claim 15, wherein the processor further comprises logic to, in response to the determination that the trace output page is not resident in the main memory, pause the virtual machine, write a value to the tracing register indicating that the tracing is disabled, and remove the trace data from the buffer.

20. The system of claim 15, wherein the processor further comprises logic to, in response to the determination that the trace output page is not resident in the main memory:
load the trace output page into the main memory;
write a value to the tracing register indicating that tracing is enabled; and
resume the virtual machine.

\* \* \* \* \*